United States Patent
Kamiya

(10) Patent No.: US 10,024,758 B2
(45) Date of Patent: Jul. 17, 2018

(54) ABNORMALITY DETECTING DEVICE HAVING FUNCTION FOR DETECTING ABNORMALITY OF MACHINE TOOL, AND ABNORMALITY DETECTING METHOD

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 176 days.

(21) Appl. No.: 15/135,495

(22) Filed: Apr. 21, 2016

(65) Prior Publication Data

US 2016/0341631 A1 Nov. 24, 2016

(30) Foreign Application Priority Data

May 19, 2015 (JP) ................................. 2015-102140

(51) Int. Cl.
| | |
|---|---|
| G08B 21/00 | (2006.01) |
| G01M 13/00 | (2006.01) |
| B23Q 17/00 | (2006.01) |
| G01M 13/04 | (2006.01) |

(52) U.S. Cl.
CPC ............ *G01M 13/00* (2013.01); *B23Q 17/00* (2013.01); *G01M 13/04* (2013.01)

(58) Field of Classification Search
CPC .... B23Q 17/003; G01M 13/00; G05B 19/048
USPC ...... 340/680; 369/47.44, 235; 318/626, 461, 318/639, 364
See application file for complete search history.

(56) References Cited

U.S. PATENT DOCUMENTS

| | | | | |
|---|---|---|---|---|
| 5,701,284 | A * | 12/1997 | Lee ......................... | G11B 19/20 360/73.03 |
| 5,894,204 | A * | 4/1999 | Kumita .................... | H02P 6/24 318/362 |
| 6,118,743 | A * | 9/2000 | Kumita .................. | G11B 19/20 369/47.44 |
| 2004/0213139 | A1* | 10/2004 | Fukui .................. | G11B 19/124 369/235 |

(Continued)

FOREIGN PATENT DOCUMENTS

| | | |
|---|---|---|
| JP | 62-259397 A | 11/1987 |
| JP | 1-106487 A | 4/1989 |

(Continued)

*Primary Examiner* — Hoi Lau
(74) *Attorney, Agent, or Firm* — Hauptman Ham, LLP

(57) ABSTRACT

An abnormality detecting device and method for detecting a symptom of a failure of a spindle of a machine tool before the spindle malfunctions. The abnormality detecting device for detecting an abnormality or malfunction includes a spindle motor and a motor controller. The motor controller includes a time measuring part which measures a spindle stopping time from when a free-run of the spindle motor accelerated to a predetermined number of rotations is started to when the spindle motor is stopped, a storing part which stores the spindle stopping time measured by the time measuring part, and a comparing part which compares a plurality of data with respect to the spindle stopping time stored in the storing part, and judges as to whether or not an abnormality exists in the spindle or the spindle motor.

9 Claims, 4 Drawing Sheets

(56) References Cited

U.S. PATENT DOCUMENTS

| | | | |
|---|---|---|---|
| 2006/0261969 A1* | 11/2006 | Takaku | B23Q 17/003 340/680 |
| 2007/0121267 A1 | 5/2007 | Kotani et al. | |
| 2008/0106815 A1* | 5/2008 | Kajikawa | G11B 19/048 360/31 |
| 2011/0109257 A1* | 5/2011 | Someya | B30B 15/142 318/626 |
| 2013/0082631 A1* | 4/2013 | Suzuki | B25F 5/00 318/461 |
| 2013/0234643 A1* | 9/2013 | Shibata | H02P 23/0004 318/639 |
| 2016/0138504 A1 | 5/2016 | Miyamoto et al. | |
| 2016/0341631 A1* | 11/2016 | Kamiya | G01M 13/00 |
| 2017/0205791 A1* | 7/2017 | Yang | G05B 19/048 |

FOREIGN PATENT DOCUMENTS

| | | |
|---|---|---|
| JP | 8-93758 A | 4/1996 |
| JP | 8-170824 A | 7/1996 |
| JP | 2001-259972 A | 9/2001 |
| JP | 2005-74545 A | 3/2005 |
| JP | 2014-1854 A | 1/2014 |
| WO | 2005/057993 A1 | 12/2007 |
| WO | 2014/207854 A1 | 2/2017 |

* cited by examiner

ABNORMALITY DETECTING DEVICE HAVING FUNCTION FOR DETECTING ABNORMALITY OF MACHINE TOOL, AND ABNORMALITY DETECTING METHOD

RELATED APPLICATIONS

The present application claims priority to Japanese Patent Application Number 2015-102140 filed May 19, 2015, the disclosure of which is hereby incorporated by reference herein in its entirety.

BACKGROUND OF THE INVENTION

1. Field of the Invention

The present invention relates to an abnormality detecting device having a function for detecting an abnormality in a spindle or a spindle motor of a machine tool, and relates to an abnormality detecting method.

2. Description of the Related Art

In many cases, malfunction of a spindle of a machine tool or a spindle motor for driving the spindle is due to deterioration or breakage of a bearing of the spindle or the spindle motor. If the machine tool is operated when the spindle has a complete malfunction, processing accuracy of a workpiece is deteriorated and the workpiece will become a defective product. In addition, when it takes a time to restore the spindle, the machine tool must be suspended for a long time, whereby an operation rate of the machine tool is lowered.

Therefore, by detecting a symptom of a failure (or deterioration) of the spindle before the spindle has a complete malfunction and taking appropriate measures (for example, repairing the spindle), the suspension time (or downtime) can be reduced and the operation rate of the machine tool can be improved. In the prior art, a method for measuring deterioration of vibration of a spindle or a spindle motor, and a method for detecting an abnormal noise thereof are known as a method for detecting an abnormality of the spindle.

For example, JP 2005-074545 A discloses a status monitoring device for a machine tool, and it is described that vibration data is measured by using an AE sensor, an amplifier and a bandpass filter after receiving a spindle rotation command and a feed axis drive command, and then, the number of times, that the vibration data exceeds a threshold calculated from spindle rotation information, is counted by a level counter. Then, the counted number is compared to an alarm level so as to judge the status of the spindle, and an alarm is displayed on an alarm display if necessary.

Further, JP 2001-259972 A discloses a magnetic bearing unit for a machine tool, and it is described that, by providing: a vibration detecting means for detecting vibration of a spindle; a frequency characteristic variable filter for extracting a vibration component synchronized with the rotation of the spindle from an output signal of the vibration detecting means; and a judging means for judging a state in which a level of the output signal extracted by the variable filter exceeds a specified level as an abnormal state, the abnormal state such as mounting failure or rotational fault of a tooling can be automatically detected, whereby processing deficiency of a workpiece can be reduced.

In order to detect vibration of a spindle, it is necessary to attach vibration measuring equipment, etc., to the spindle or a spindle motor. When the vibration is manually detected, an operator must hold the measuring equipment in his/her hand and measure the vibration of each component of the machine tool at regular intervals, which is a big burden on the operator. On the other hand, the vibration of the spindle can be automatically detected by a vibration sensor, etc. In this case, however, the vibration sensor must be always attached to the spindle, whereby cost of the machine tool is increased.

When an abnormality of a spindle is detected by catching an abnormal noise of the spindle, the abnormality of each component of the machine tool is periodically and aurally rally detected by the operator, which is also a big burden on the operator. On the other hand, the abnormal noise can be automatically detected by a microphone, etc. In this case, however, it is difficult to appropriately detect the abnormal noise since a factory in which the machine tool is installed is very noisy, and further, it is costly to arrange the microphone.

SUMMARY OF THE INVENTION

An object of the present invention is to provide an abnormality detecting device and method for detecting a sign of a malfunction (or an abnormality) of a spindle of a machine tool, before the spindle has the malfunction.

One aspect of the present invention provides an abnormality detecting device comprising: a spindle motor for driving a spindle of a machine tool; and a motor controller for controlling the spindle motor, wherein the motor controller comprises: a time measuring part which measures a spindle stopping time from when the spindle motor is accelerated to a predetermined number of rotations to when the spindle motor is stopped after free-run of the spindle motor; a storing part which stores the spindle stopping time measured by the time measuring part; and a comparing part which compares a plurality of data with respect to the spindle stopping time stored in the storing part, the plurality of data including data when the spindle is normal, and judges as to whether an abnormality of the spindle or the spindle motor exists or not based on a comparison result.

In a preferred embodiment, the abnormality detecting device further comprises at least one of: a spindle temperature sensor which detects a temperature of the spindle; and a motor temperature sensor which detects a temperature of the spindle motor, wherein the comparing part judges as to whether an abnormality of the spindle or the spindle motor exists or not based on data of the spindle stopping time stored in the storing part, and the temperature of the spindle detected by the spindle temperature sensor or the temperature of the spindle motor detected by the motor temperature sensor.

In a preferred embodiment, the abnormality detecting device further comprises at least one of: a spindle velocity sensor which detects a velocity of the spindle; and a motor velocity sensor which detects a velocity of the spindle motor, wherein the comparing part judges as to whether an abnormality of the spindle or the spindle motor exists or not based on data of the spindle stopping time stored in the storing part, and the velocity of the spindle detected by the spindle velocity sensor or the velocity of the spindle motor detected by the motor velocity sensor.

In a preferred embodiment, the comparing part judges that an abnormality of the spindle or the spindle motor exists when the spindle stopping time is below a predetermined threshold.

In a preferred embodiment, the comparing part judges that an abnormality of the spindle or the spindle motor exists when a change rate of the spindle stopping time periodically measured is out of a range of a predetermined stopping time.

In a preferred embodiment, the comparing part judges that an abnormality of the spindle or the spindle motor exists when the spindle stopping time is below a predetermined time, under constant temperature.

In a preferred embodiment, the comparing part judges that an abnormality of the spindle or the spindle motor exists when the spindle stopping time at a first state, in which the temperature of the spindle or the spindle motor is a first value, is shorter than the spindle stopping time at a second state, in which the temperature of the spindle or the spindle motor is a second value lower than the first value.

In a preferred embodiment, the comparing part judges that an abnormality of the spindle or the spindle motor exists when a change rate of the spindle stopping time periodically measured is out of a range of a predetermined stopping time, under constant temperature.

In a preferred embodiment, the comparing part judges that an abnormality of the spindle or the spindle motor exists when a deceleration rate of the spindle or the spindle motor at the free-run exceeds a predetermined threshold.

Another aspect of the present invention provides a method for detecting an abnormality of a spindle of a machine tool or a spindle motor for driving the spindle, the method comprising the steps of: measuring a spindle stopping time from when the spindle motor is accelerated to a predetermined number of rotations to when the spindle motor is stopped after free-run of the spindle motor; storing the spindle stopping time; comparing a plurality of data with respect to the stored spindle stopping time, the plurality of data including data when the spindle is normal; and judging as to whether an abnormality of the spindle or the spindle motor exists or not based on a comparison result.

In a preferred embodiment, the method further comprises the step of detecting at least one of a temperature of the spindle and a temperature of the spindle motor, so as to judge as to whether an abnormality of the spindle or the spindle motor exists or not based on data of the stored spindle stopping time, and the temperature of the spindle or the temperature of the spindle motor.

In a preferred embodiment, the method further comprises the step of detecting at least one of a velocity of the spindle and a velocity of the spindle motor, so as to judge as to whether an abnormality of the spindle or the spindle motor exists or not based on data of the stored spindle stopping time, and the velocity of the spindle or the velocity of the spindle motor.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
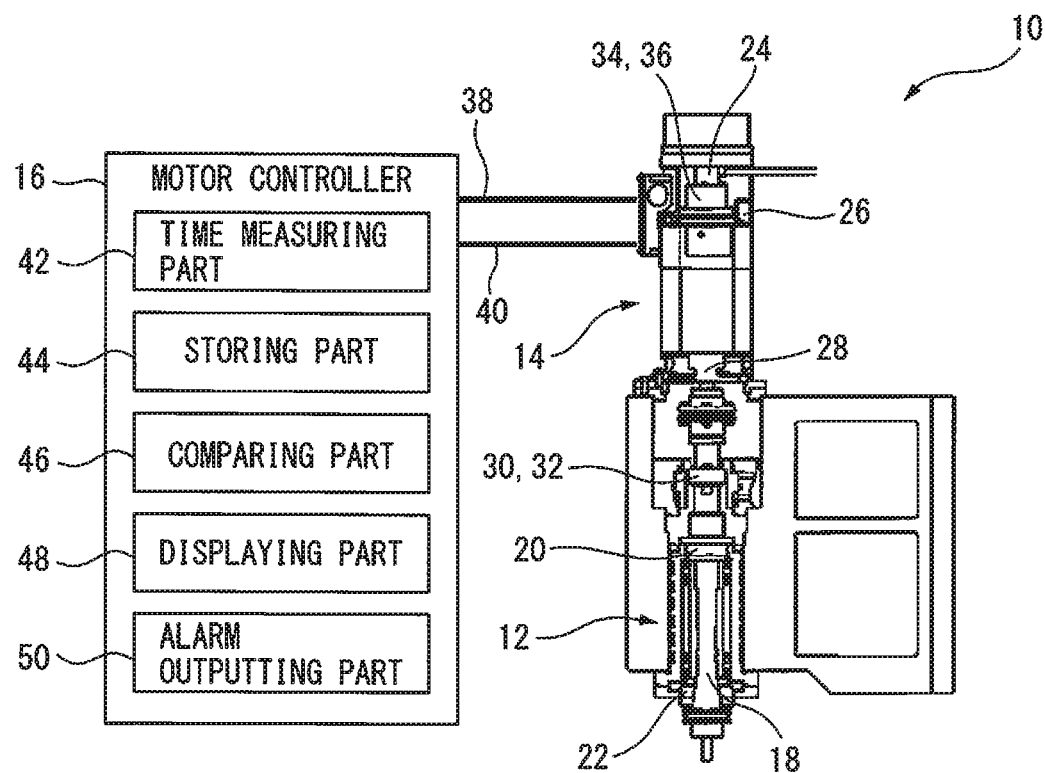
FIG. 1 shows an example of a configuration about a spindle a machine tool, to which the present invention can be applied.

FIG. 1 shows an example of a configuration about a spindle a machine tool, to which the present invention can be applied. Machine tool 10 (only major components thereof are illustrated) has a spindle 12, a spindle motor 14 such as a servomotor for rotationally driving spindle 12, and a motor controller 16 for controlling spindle motor 14. Spindle 12 has a rotatable spindle rotor 18, and spindle bearings 20, 22 configured to rotatably support both axial ends of spindle rotor 18. On the other hand, spindle motor 14 has a rotatable motor rotor 24, and motor bearings 26, 28 configured to rotatably support both axial ends of motor rotor 24.

Machine tool 10 has a spindle velocity sensor (or a spindle rotation sensor) 30 for detecting the (rotational) velocity of spindle 12, a spindle temperature sensor 32 for detecting the temperature of spindle 12 (or the spindle bearing), a motor velocity sensor (or a motor rotation sensor) 34 for detecting the (rotational) velocity of spindle motor 14, and a motor temperature sensor 36 for detecting the temperature of spindle motor 14 (or the motor bearing).

Spindle motor 14 and motor controller 16 are connected to each other via a power cable 38, so that driving power is supplied to spindle motor 14. Further, spindle motor 14 and motor controller 16 are connected to each other via a signal cable 40, so that measuring results (or outputs) from spindle velocity sensor 30, spindle temperature sensor 32, motor velocity sensor 34 and motor temperature sensor 36 are transmitted to motor controller 16.

In the present embodiment, an abnormality detecting device for detecting an abnormality or malfunction (in particular, deterioration or damage of spindle bearings 20, 22 or motor bearings 26, 28) includes spindle motor 14 and motor controller 16. Motor controller 16 includes a time measuring part (or a timer) 42 which measures a period of time (or a spindle stopping time) from when a free-run of spindle motor 14 accelerated to a predetermined number of rotations is started to when spindle motor 14 (or spindle 12) is stopped, a storing part 44 which stores the spindle stopping time measured by time measuring part 42, and a comparing part 46 which compares a plurality of data with respect to the spindle stopping time stored in storing part 44, the plurality of data including data when the spindle is normal, and judges as to whether or not an abnormality exists in the spindle or the spindle motor. Further, depending how the abnormality is detected, the abnormality detecting device includes at least one of spindle velocity sensor 30, spindle temperature sensor 32, motor velocity sensor 34 and motor temperature sensor 36.

Motor controller 16 may include a displaying part such as a screen configured to display a comparison result (for example, graphs as shown in FIGS. 2 to 6) obtained by comparing part 46. Further, motor controller 16 may include an alarm outputting part 50 which outputs an alarm, etc., when comparing part 46 detects the abnormality.

Hereinafter, a method for detecting the abnormality or malfunction of spindle 12 or spindle motor 14, by using the abnormality detecting device of the present invention. Although a method for detecting the abnormality of the spindle or the spindle bearing will be explained below, it is obvious that the abnormality of the spindle motor or the motor bearing can be by the same method.

Figure 2:
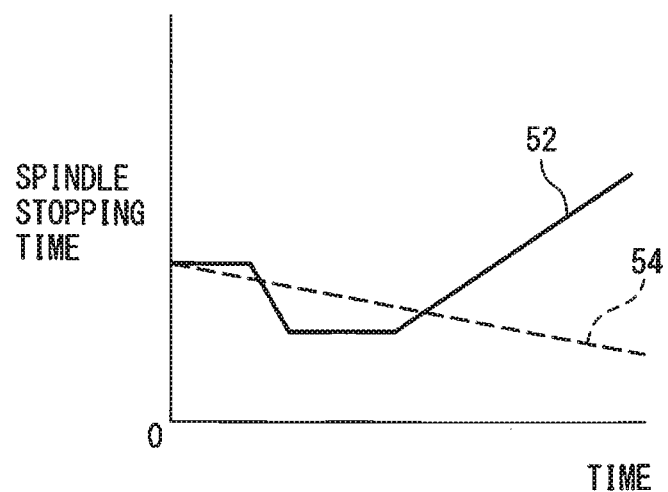
FIG. 2 shows a graph explaining an example in which an abnormality is detected based on a change rate of a spindle stopping time periodically measured.
Figure 3:
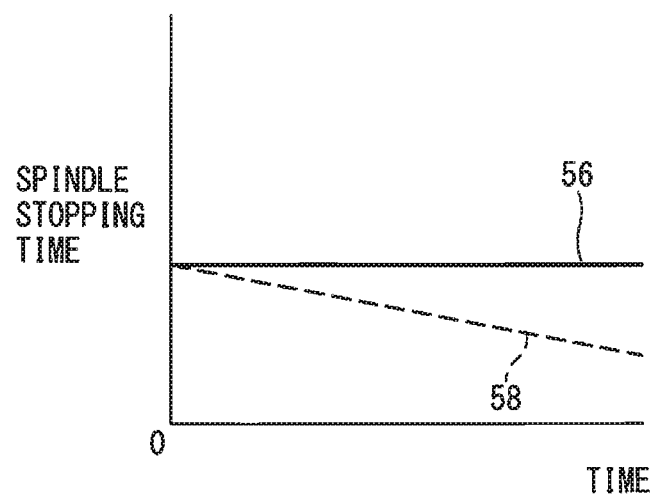
FIG. 3 shows a graph explaining another example in which an abnormality is detected based on a change rate of a spindle stopping time periodically measured.

First, FIGS. 2 and 3 show examples in which it is judged that an abnormality has occurred in the spindle or the spindle motor when a change rate of the spindle stopping time periodically measured exceeds a predetermined range of the spindle stopping time. Concretely, FIG. 2 shows that a grease lubrication-type bearing is used, and FIG. 3 shows that an oil-air lubrication-type bearing is used.

Regarding FIG. 2, in the spindle using the grease lubrication-type bearing, when the spindle stopping time is measured periodically (for example, once a day or every second day), preferably under the same temperature, an amount of base oil of the grease is decreased in an initial state, and a ratio of thickener in the grease is increased. Therefore, the viscosity of the grease is gradually increased, and thus the spindle stopping time is gradually shortened. After that, the thickener is destroyed from a certain point of time, and the viscosity of the grease is gradually lowered, whereby the spindle stopping time is gradually lengthened. As a result, in a normal spindle, a relationship between the spindle stopping time and an elapsed time is represented by a graph 52 in FIG. 2. Such a measurement result is previously stored in storing part 44, as a temporal change in the spindle stopping time when the spindle is normal.

On the other hand, when an abnormality occurs in the spindle, a temporal change in the spindle stopping time is deviated from graph 52 at the normal state, as exemplified by a graph 54 in FIG. 2. Therefore, when the change rate of the spindle stopping time periodically measured exceeds the previously determined or stored change rate of the stopping time (i.e., at the normal state), it can be judged that an abnormality has occurred in the spindle. Alternatively, when the periodically measured stopping time is below a predetermined threshold, it can be judged that an abnormality has occurred in the spindle. For example, the threshold may be determined as a lower limit value of the spindle stopping time, in which the spindle is considered as normal.

Regarding FIG. 3, in the spindle using the oil-air lubrication-type bearing, a new or fresh lubricant agent is always supplied to the bearing. Therefore, even when the spindle stopping time is measured periodically (for example, once a day or every second day), preferably under the same temperature, a change rate of the spindle stopping time is small, i.e., the spindle stopping time is nearly unchanged, as shown by a graph 56. A measurement result such as graph 56 is previously stored in storing part 44, as a temporal change in the spindle stopping time when the spindle is normal.

On the other hand, when an abnormality occurs in the spindle, a temporal change in the spindle stopping time is deviated from graph 56 at the normal state (for example, the spindle stopping time is gradually decreased), as exemplified by a graph 58 in FIG. 3. Therefore, similarly to the case in FIG. 2, when the change rate of the spindle stopping time periodically measured exceeds the previously determined or stored change rate of the stopping time (i.e., at the normal state), it can be judged that an abnormality has occurred in the spindle. Alternatively, when the periodically measured stopping time is below a predetermined threshold, it can be judged that an abnormality has occurred in the spindle. For example, the threshold may be determined as a lower limit value of the spindle stopping time, in which the spindle is considered as normal.

Figure 4:
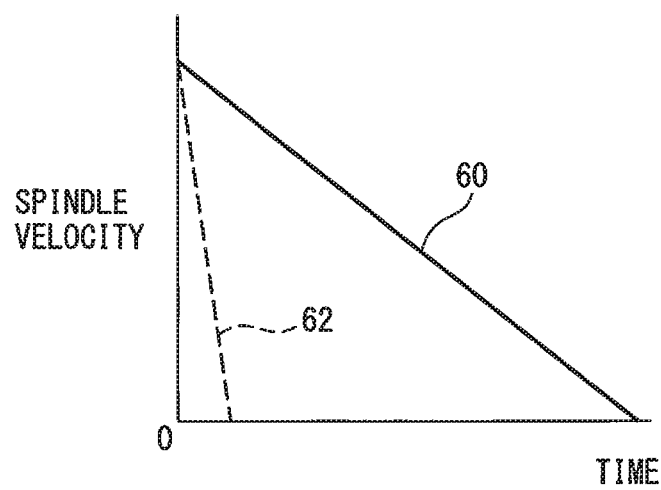
FIG. 4 shows a graph explaining an example in which an abnormality is detected based on a free-run time and a temperature of the spindle.

Next, FIG. 4 shows an example in which a malfunction of the spindle is detected based on the free-run time and the temperature of the spindle, under the same temperature. Since the viscosity of the grease or lubricant agent is increased as the temperature thereof is decreased, the free-run time of the spindle is shortened as the temperature is decreased, when the spindle is normal. However, when a track surface of the spindle is roughened or rusted, a rotational load of the spindle is increased, whereby the free-run time of the spindle is significantly decreased.

FIG. 4 shows a concrete example regarding the significant decrease in the free-run time. A graph 60 shows that the spindle is normal, and a graph 62 shows that the free-run time is significantly short due to the roughness of the track surface of the spindle, etc., even though the spindle temperature in graph 62 is the same as graph 60. The free-run time of the spindle in the normal state as shown by graph 60 is associated with the spindle temperature and stored in storing part 44. Then, as shown by graph 62, when the other free-run time under the same temperature as graph 60 is below a predetermined threshold, it can be judged that the abnormality exists in the spindle. For example, the threshold may be determined as a lower limit value of the spindle stopping time, in which the spindle is considered as normal.

Figure 5A:
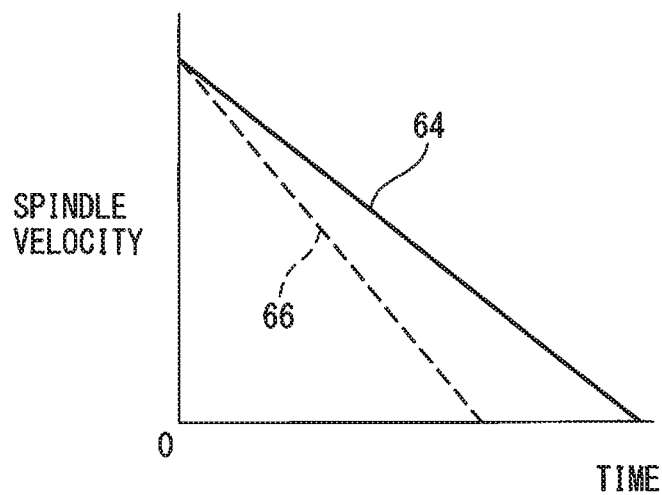
FIG. 5a shows a graph explaining another example in which an abnormality is detected based on a free-run time and a temperature of the spindle, when the spindle is in a normal state.
Figure 5B:
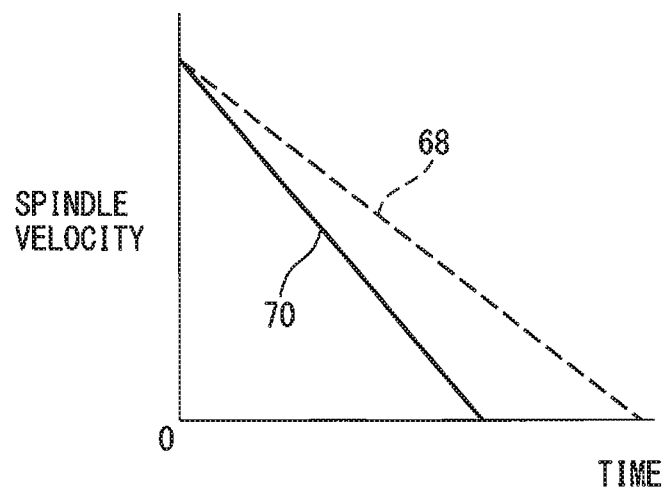
FIG. 5b shows a graph similar to the graph of FIG. 5a, when the spindle is in an abnormal state.

Next, FIGS. 5a and 5b show examples in which a malfunction of the spindle is detected based on the free-run time and the temperature of the spindle, under the same temperature. In general, the free-run time is increased as a mechanical loss of the spindle is small. Therefore, when the bearing is normal (or the bearing does not have an abnormality), the viscosity of lubricant oil or lubricant grease in the bearing is lowered as the bearing temperature is increased, whereby the mechanical loss of the bearing is decreased and the free-run time is lengthened. FIG. 5a shows a concrete example of this case, in which graphs 64 and 66 represent a temporal change in the velocity of the spindle in the free-run from the same velocity. In this regard, since the spindle temperature in graph 64 is higher than the spindle temperature in graph 66, the free-run time (or a period of time from when the free-run is started to when the spindle is stopped) in graph 64 is longer than the free-run time in graph 66. A measurement result regarding the free-run time and the spindle temperature, such as graph 64, is previously stored in storing part 44, as data when the spindle is normal.

If a holder, etc., of the bearing is broken and a broken piece of the holder is positioned in the bearing, the broken piece may result in a large mechanical loss, whereby the free-run time may be varied without depending on the temperature. For example, the free-run time may be lengthened even when the spindle temperature is relatively low. FIG. 5b shows a concrete example of this case, in which graphs 68 and 70 represent a temporal change in the velocity of the spindle in the free-run from the same velocity. In this regard, even though the spindle temperature in graph 68 is lower than the spindle temperature in graph 70, the free-run time in graph 68 is longer than the free-run time in graph 70. As such, when both the free-run time and the spindle temperature are measured and when the normal trend or characteristic of the free-run time depending on the change in the spindle temperature is not obtained (for example, when the free-run time at the high temperature is shorter than the free-run time at the low temperature), it is judged that an abnormality has occurred in the spindle.

Figure 6:
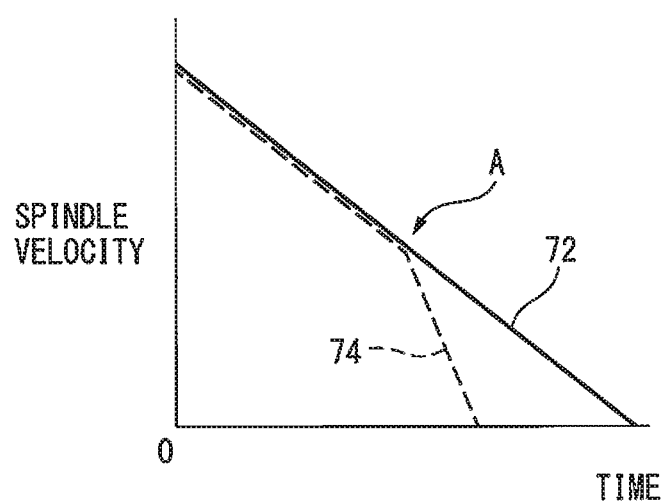
FIG. 6 shows a graph explaining another example in which an abnormality is detected based on a free-run time and a temperature of the spindle.

FIG. 6 shows an example in which a malfunction of the spindle is detected based on the free-run time and the velocity of the spindle. In a normal spindle, viscosity resistance of the grease or lubricant oil and air resistance account for a large part of a mechanical loss of the spindle. Therefore, a deceleration rate of the spindle in the free-run is almost constant or decreased as the spindle velocity is decreased. FIG. 6 shows a concrete example of this case, in which a graph 72 represents the deceleration rate (or minus acceleration rate) of the spindle velocity that is almost constant.

On the other hand, in a spindle having an abnormality (for example, when a broken piece, etc., of a holder exists in a spindle bearing), a ball of the bearing may come in contact with the broke piece and then the deceleration rate may be rapidly increased. A graph 74 in FIG. 6 shows a concrete example of this case, in which the deceleration rate of the spindle velocity is rapidly increased from a time point "A." As such, the change in the deceleration rate in the normal state as shown by graph 72 is previously stored in storing part 44. Then, when the other deceleration rate under the same condition as graph 72 exceeds a predetermined threshold of the deceleration rate, it can be judged that the abnormality exists in the spindle. For example, the threshold may be determined as an upper limit value of the deceleration rate, in which the spindle is considered as normal.

In the example of FIG. 2, 3 or 6, spindle temperature sensor 32 or motor temperature sensor 36 may be used so as to compare the data in the normal state and the data to be judged as to whether or not the abnormality exists, under the constant temperature. By virtue of this, the influence of the temperature can be eliminated, whereby it can be precisely judged as to whether or not the abnormality exists.

According to the present invention, by using the temporal change in the stopping time during the free-run of the spindle, a symptom of a failure, such as deterioration of the spindle or the spindle motor, can be detected as an abnormality. Therefore, a malfunction of the machine tool can be prevented from occurring, at a lower cost than the prior art.

In many cases, the spindle or the spindle motor is previously provided with a velocity sensor and/or a temperature sensor. By using these sensors, the symptom of the failure of the spindle can be automatically detected and recognized by the operator, without substantially increasing cost. Therefore, the suspension time of the machine tool can be reduced and the operation rate of the machine tool can be improved.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. An abnormality detecting device comprising:
a spindle motor for driving a spindle of a machine tool; and
a motor controller for controlling the spindle motor,
wherein the motor controller comprises:
a time measuring part which measures a spindle stopping time from when the spindle motor is accelerated to a predetermined number of rotations to when the spindle motor is stopped after free-run of the spindle motor;
a storing part which stores the spindle stopping time measured by the time measuring part; and
a comparing part which compares a plurality of data with respect to the spindle stopping time stored in the storing part, the plurality of data including data when the spindle is normal, and judges as to whether an abnormality of the spindle or the spindle motor exists or not based on a comparison result.

2. The abnormality detecting device as set forth in claim 1, further comprising at least one of: a spindle temperature sensor which detects a temperature of the spindle; and a motor temperature sensor which detects a temperature of the spindle motor,
wherein the comparing part judges as to whether an abnormality of the spindle or the spindle motor exists or not based on data of the spindle stopping time stored in the storing part, and the temperature of the spindle detected by the spindle temperature sensor or the temperature of the spindle motor detected by the motor temperature sensor.

3. The abnormality detecting device as set forth in claim 1, further comprising at least one of: a spindle velocity sensor which detects a velocity of the spindle; and a motor velocity sensor which detects a velocity of the spindle motor,
wherein the comparing part judges as to whether an abnormality of the spindle or the spindle motor exists or not based on data of the spindle stopping time stored in the storing part, and the velocity of the spindle detected by the spindle velocity sensor or the velocity of the spindle motor detected by the motor velocity sensor.

4. The abnormality detecting device as set forth in claim 1, wherein the comparing part judges that an abnormality of the spindle or the spindle motor exists when the spindle stopping time is below a predetermined threshold.

5. The abnormality detecting device as set forth in claim 1, wherein the comparing part judges that an abnormality of the spindle or the spindle motor exists when a change rate of the spindle stopping time periodically measured is out of a range of a predetermined stopping time.

6. The abnormality detecting device as set forth in claim 2, wherein the comparing part judges that an abnormality of the spindle or the spindle motor exists when the spindle stopping time is below a predetermined time, under constant temperature.

7. The abnormality detecting device as set forth in claim 2, wherein the comparing part judges that an abnormality of the spindle or the spindle motor exists when the spindle stopping time at a first state, in which the temperature of the spindle or the spindle motor is a first value, is shorter than the spindle stopping time at a second state, in which the temperature of the spindle or the spindle motor is a second value lower than the first value.

8. The abnormality detecting device as set forth in claim 2, wherein the comparing part judges that an abnormality of the spindle or the spindle motor exists when a change rate of the spindle stopping time periodically measured is out of a range of a predetermined stopping time, under constant temperature.

9. The abnormality detecting device as set forth in claim 3, wherein the comparing part judges that an abnormality of the spindle or the spindle motor exists when a deceleration rate of the spindle or the spindle motor at the free-run exceeds a predetermined threshold.

* * * * *